US010461809B2

(12) United States Patent
Merrick et al.

(10) Patent No.: US 10,461,809 B2
(45) Date of Patent: Oct. 29, 2019

(54) CONTROLLING POWER TO A LOAD WITH SIGNALS ALONG A POWER LINE

(71) Applicant: LIGHTING AND ILLUMINATION TECHNOLOGY EXPERIENCE LIMITED, Burnley, Lancashire (GB)

(72) Inventors: Michael John Merrick, Otley (GB); Rod Holt, Otley (GB)

(73) Assignee: LIGHTING AND ILLUMINATION TECHNOLOGY EXPERIENCE LIMITED, Lancashire (GB)

(*) Notice: Subject to any disclaimer, the term of this patent is extended or adjusted under 35 U.S.C. 154(b) by 5 days.

(21) Appl. No.: 15/563,264

(22) PCT Filed: Mar. 30, 2016

(86) PCT No.: PCT/GB2016/050883
§ 371 (c)(1),
(2) Date: Sep. 29, 2017

(87) PCT Pub. No.: WO2016/156832
PCT Pub. Date: Oct. 6, 2016

(65) Prior Publication Data
US 2018/0097544 A1  Apr. 5, 2018

(30) Foreign Application Priority Data
Mar. 30, 2015  (GB) .................................. 1505454.7

(51) Int. Cl.
*H04B 3/54* (2006.01)
*H05B 37/02* (2006.01)
(Continued)

(52) U.S. Cl.
CPC .............. *H04B 3/542* (2013.01); *H04B 3/02* (2013.01); *H05B 33/0809* (2013.01);
(Continued)

(58) Field of Classification Search
CPC .............. H04B 3/54; H04B 2203/5491; H05B 37/0263; H05B 33/0809; H05B 33/0857
(Continued)

(56) References Cited

U.S. PATENT DOCUMENTS 4,060,735 A * 11/1977 Pascucci ............. H02J 13/0089
307/3
4,408,185 A * 10/1983 Rasmussen ......... H02J 13/0051
307/3
(Continued)

FOREIGN PATENT DOCUMENTS

CN  202150981 U  2/2012
CN  202587532 U  12/2012
(Continued)

OTHER PUBLICATIONS

Search Report, Application No. GB1505454.7, United Kingdom Intellectual Property Office, dated Sep. 30, 2015, pp. 1-4, Newport, South Wales.
(Continued)

Primary Examiner — James M Perez
(74) Attorney, Agent, or Firm — MH2 Technology Law Group, LLP

(57) ABSTRACT

A circuit, system and method for controlling electrical power to a load, the circuit has a controller with power supply input nodes and a controller data input node. Two power supply input terminals supply electrical power to the circuit. A digital control signal pre-processing unit couples one of the power supply input terminals to the controller data input node. The digital control signal pre-processing unit has a capacitor arranged to block voltage biasing resulting from power supplied across electrical power supply input terminals from being supplied to the controller data input node. The digital control signal pre-processing unit is arranged to generate positive and negative voltage impulses in response
(Continued)

to corresponding rising and falling edges of a digital control signal provided at the power supply input terminals. The digital control signal pre-processing unit is further arranged to generate a revised version of the digital control signal without the voltage biasing.

16 Claims, 6 Drawing Sheets

(51) Int. Cl.
*H04B 3/02* (2006.01)
*H05B 33/08* (2006.01)
(52) U.S. Cl.
CPC ..... *H05B 33/0857* (2013.01); *H05B 37/0263* (2013.01); *H04B 2203/5491* (2013.01)
(58) Field of Classification Search
USPC .................................. 375/286–288, 257–258
See application file for complete search history.

(56) References Cited

U.S. PATENT DOCUMENTS

| | | | | |
|---|---|---|---|---|
| 5,233,646 A * | 8/1993 | Kuromi | ................ | H04B 1/202 340/12.32 |
| 5,257,006 A * | 10/1993 | Graham | ................ | H04B 3/54 307/11 |
| 5,264,823 A * | 11/1993 | Stevens | ................ | H04B 3/542 340/12.35 |
| 5,859,584 A * | 1/1999 | Counsell | ............ | H02J 13/0003 340/12.33 |
| 5,920,253 A * | 7/1999 | Laine | ................ | H04B 3/54 340/12.33 |
| 5,929,749 A * | 7/1999 | Slonim | ................ | H04B 3/54 307/11 |
| 6,388,232 B1 * | 5/2002 | Samodell | ............ | B23K 9/0673 219/130.33 |
| 6,553,076 B1 * | 4/2003 | Huang | ................ | H04B 3/548 375/219 |
| 6,586,890 B2 * | 7/2003 | Min | ................ | B60Q 1/2607 315/224 |
| 7,391,168 B1 * | 6/2008 | Dernovsek | .......... | H02J 13/0051 315/291 |
| 7,843,145 B2 * | 11/2010 | McKenzie | .......... | H02J 13/0027 315/291 |
| 8,390,435 B2 * | 3/2013 | Maros | ................ | H05B 41/295 315/294 |
| 8,674,539 B1 * | 3/2014 | Magin | ................ | H02J 13/0044 307/1 |
| 9,084,333 B2 * | 7/2015 | Chandran | .......... | H05B 37/0263 |
| 9,217,578 B2 * | 12/2015 | Jo | ................ | H04B 3/548 |
| 9,392,675 B2 * | 7/2016 | Taipale | ............ | H05B 37/0263 |
| 2003/0127997 A1 * | 7/2003 | Shoji | ................ | H02M 7/53803 315/291 |
| 2006/0202640 A1 * | 9/2006 | Alexandrov | ....... | H05B 37/0263 315/291 |
| 2010/0079083 A1 * | 4/2010 | Seguine | ............ | H05B 37/0254 315/292 |
| 2011/0032085 A1 * | 2/2011 | Maros | ................ | H05B 37/0263 340/12.32 |
| 2011/0115399 A1 * | 5/2011 | Sadwick | ............ | H05B 33/0818 315/287 |
| 2011/0199943 A1 * | 8/2011 | Guillot | ...................... | H04B 3/54 370/276 |
| 2012/0128081 A1 * | 5/2012 | Hikihara | .................. | H04B 3/54 375/257 |
| 2012/0177133 A1 * | 7/2012 | Oldenkamp | ............. | H04B 3/54 375/257 |
| 2014/0265880 A1 * | 9/2014 | Taipale | ............. | H05B 37/0263 315/158 |
| 2015/0132006 A1 * | 5/2015 | Inoue | ................ | H05B 37/0263 398/118 |
| 2016/0156384 A1 * | 6/2016 | Fabre | ................ | H04B 3/54 375/257 |
| 2016/0211841 A1 * | 7/2016 | Harrison | ................ | H02M 1/44 |
| 2018/0279429 A1 * | 9/2018 | Sadwick | ................ | H05B 33/08 |
| 2019/0021154 A1 * | 1/2019 | Sadwick | ............ | F21V 23/0471 |

FOREIGN PATENT DOCUMENTS

| | | |
|---|---|---|
| EP | 0395494 A2 | 10/1990 |
| EP | 0395494 A3 | 1/1992 |
| EP | 1016062 A1 | 7/2000 |
| EP | 1016062 B1 | 8/2002 |
| EP | 1046196 B9 | 7/2011 |
| EP | 2866354 A1 | 4/2015 |
| WO | 2010117340 A1 | 10/2010 |

OTHER PUBLICATIONS

International Search Report and Written Opinion for PCT/GB2016/050883, International Searching Authority/European Patent Office, dated Jun. 14, 2016, pp. 1-10.
International Preliminary Report on Patentability for PCT/GB2016/050883, International Bureau of WIPO, dated Oct. 12, 2017, pp. 1-7, Geneva, Switzerland.

* cited by examiner

CONTROLLING POWER TO A LOAD WITH SIGNALS ALONG A POWER LINE

FIELD OF THE INVENTION

The present invention relates to circuits, systems and methods for controlling electrical power to a load in response to control signals transmitted along a power line. More particularly, the invention relates to sending multiplexed control signals and electrical power along a common line in order to control the electrical power supplied, by the common line, to one or more loads.

BACKGROUND OF THE INVENTION

To reduce the number of cables (wires or lines) required in a system of circuits that control respective loads, control signals are often sent along the power supply lines of the system. However, problems may occur when transmitting control signals with high data rates to multiple circuits that control the supply of power to loads located along a Direct Current or very low frequency Alternating Current supply line. This is because the supply line may act as an antenna and does not provide a constant impedance due to selective switching of the loads such as, for example, lighting assemblies, motors and valves.

When considering transmitting multiplexed pulsed (binary) control signals with relatively high data rates to the circuits along the power line, the internal impedance of each circuit can load the signal. Such loading can significantly reduce the rise and fall times of the edges of the signal. Consequently, this loading limits the maximum data rate for a specified number of circuits that control the supply of power to their respective load.

SUMMARY OF THE INVENTION

According to one embodiment there is provided a circuit for controlling electrical power to a load, the circuit comprising: a controller including a two power supply input nodes and a controller data input node; two power supply input terminals for supplying electrical power to the circuit; and a digital control signal pre-processing unit coupling one of the power supply input terminals to the controller data input node, the digital control signal pre-processing unit including a capacitor arranged to block voltage biasing resulting from power supplied to electrical power supply input terminals from being supplied to the controller data input node, wherein the digital control signal pre-processing unit is arranged to generate positive and negative voltage impulses in response to corresponding rising and falling edges of a digital control signal provided at the power supply input terminals and wherein the digital control signal pre-processing unit is further arranged to generate a revised version of the digital control signal without the voltage biasing.

According to another embodiment there is provided a system including a signaling and driver circuit.

According to a further embodiment there is provided a method of controlling electrical power supplied to a load, the method comprising: providing a supply voltage at power supply input terminals of a circuit; providing a digital control signal to the power supply input terminals; powering a controller with the supply voltage to power supply input nodes of the controller, wherein the controller is coupled to the load; pre-processing the digital control signal by blocking a voltage bias resulting from power supplied to electrical power supply input terminals, generating positive and negative voltage impulses in response to corresponding rising and falling edges of the digital control signal, and generating a revised version of the digital control signal without the voltage biasing; and processing the revised version of the digital control signal by the processer to thereby control the electrical power supplied to a load.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE EMBODIMENTS

Figure 1:
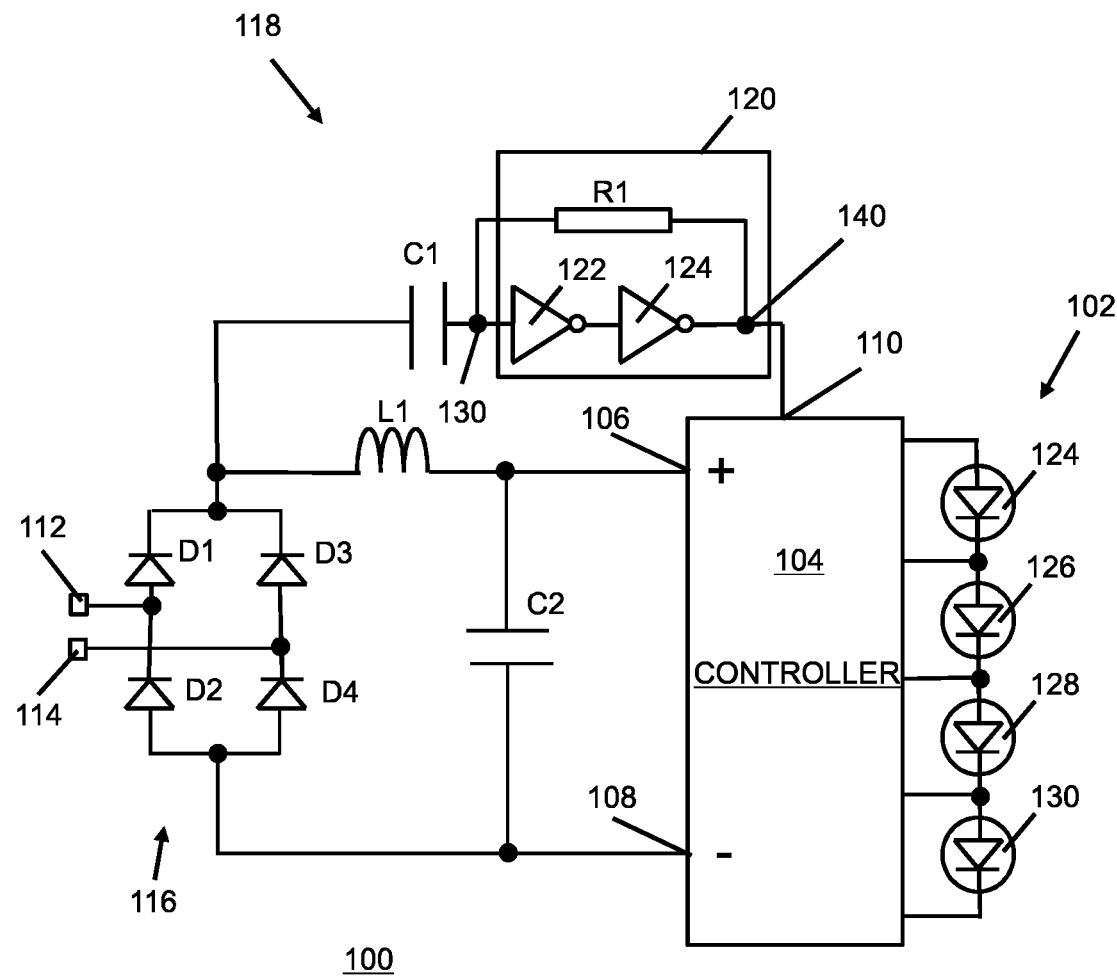
FIG. 1 is a schematic circuit diagram of a circuit for controlling electrical power to a load, according to one embodiment of the present invention.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the scope of the invention. In the drawings, like numerals are used to indicate like elements throughout. Furthermore, terms "comprises," "comprising," "including" or any other variation thereof, are intended to cover a non-exclusive inclusion, such that module, circuit, device components, systems, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

Referring now to FIG. 1 there is illustrated a circuit 100 for controlling electrical power to a load 102, according to one embodiment of the present invention. The circuit 100 includes a controller 104 that has controller power supply input nodes 106, 108 and a controller data input node 110. The circuit 100 also includes two power supply input terminals 112, 114, for supplying an electrical power to the circuit 100, and a low pass filter in the form the inductor L1 coupling the supply input terminals 112,114 through respective diodes D1, D3 to a first one of the controller power supply input nodes 106. Also, the supply input terminals 113, 114 are coupled to a second one of the controller supply input terminals 108 through respective diodes D2, D4. In one example, the inductor L1 has a value of between 4.7 to 20 Milli-Henrys and typically the inductor L1 has a value of 10 Milli-Henrys. AS will be apparent to a person skilled in the art, the low pass filter L1 is arranged to block a digital control signal provided at the power supply input terminals 112, 114 from being received at the power supply input nodes 106, 108.

The circuit 100 also includes a full wave bridge rectifier 116 that comprises four diodes D1, D2, D3 D4 arranged so that when terminal 112 has a positive potential relative terminal 114, diode D1 provides for coupling terminal 112 to the first one of the controller power supply input nodes 106 via the Inductor L1. Also, diode D4 provides for coupling terminal 114 to the second one of the controller power supply input nodes 108. Furthermore, the full wave bridge rectifier 116 is arranged so that when terminal 114 has a positive potential relative terminal 112, diode D3 provides for coupling terminal 114 to the first one of the controller power supply input nodes 106 via the Inductor L1. Also, diode D2 provides for coupling terminal 112 to the second one of the controller power supply input nodes 108.

The circuit 100 also includes a digital control signal pre-processing unit 118 coupling one of the power supply input terminals 112, 114 to the controller data input node 110. The digital control signal pre-processing unit 118 is arranged block voltage biasing resulting from power supplied to electrical power supply input terminals 112, 114 from being supplied to the controller data input node 110 and generate pulses corresponding to edges of a signal provided at the power supply input terminals 112 to be supplied to the controller data input node 110. The unit 118 includes a capacitor C1 coupled to the controller data input node 110 by a polarity triggered latch 120 that comprises an input 130, an output 140 and feedback resistor R1 connected across two series connected buffers or inverters 122, 124. However, other variations such two buffers may replace the inverters 122, 124 or an inverter or single buffer may be used. When using a single inverter the controller 104 can be arranged to take the resulting inverted signal into account.

The digital control signal pre-processing unit is arranged to generate positive PI and negative NI voltage impulses in response to corresponding rising and falling edges of the digital control signal provided at the power supply input terminals. Also, the digital control signal pre-processing unit 118 is further arranged to generate a revised version of the digital control signal (DCTRL) without the voltage biasing resulting from power supplied to electrical power supply input terminals 112, 114.

In this embodiment there is also a smoothing capacitor C2 coupled directly across the power supply input nodes 106, 108 and may form part of the low pass filter in combination with the inductor L1. In one example, this capacitor C2 has a value of 10 Micro-Farads and is provided to attenuate signals that may inadvertently be created across the controller power supply input nodes 106, 108. Thus such inadvertently created signals are prevented from being supplied to the capacitor C1.

Also, in this embodiment, the load 102 is coupled to the controller and the load 102 comprises a plurality of series coupled Light Emitting Diodes (LEDs) 124, 126, 128, 130 each adapted to emit a different colour (e.g. Red, Blue, Green or White) and each being selectively operable by the controller 104. Also, the controller 104 includes a decoder for controlling decoding and processing a digital control signal (e.g. the revised version of the digital control signal (DCTRL)) detected at the controller data input node 110. Typically, the controller 104 includes a Digital Multiplex (DMX) decoder and the controller 104 is adapted to typically selectively supply Pulse Width Modulated (PWM) current to the Light Emitting Diodes LEDs 124, 126, 128, 130.

Figure 2:
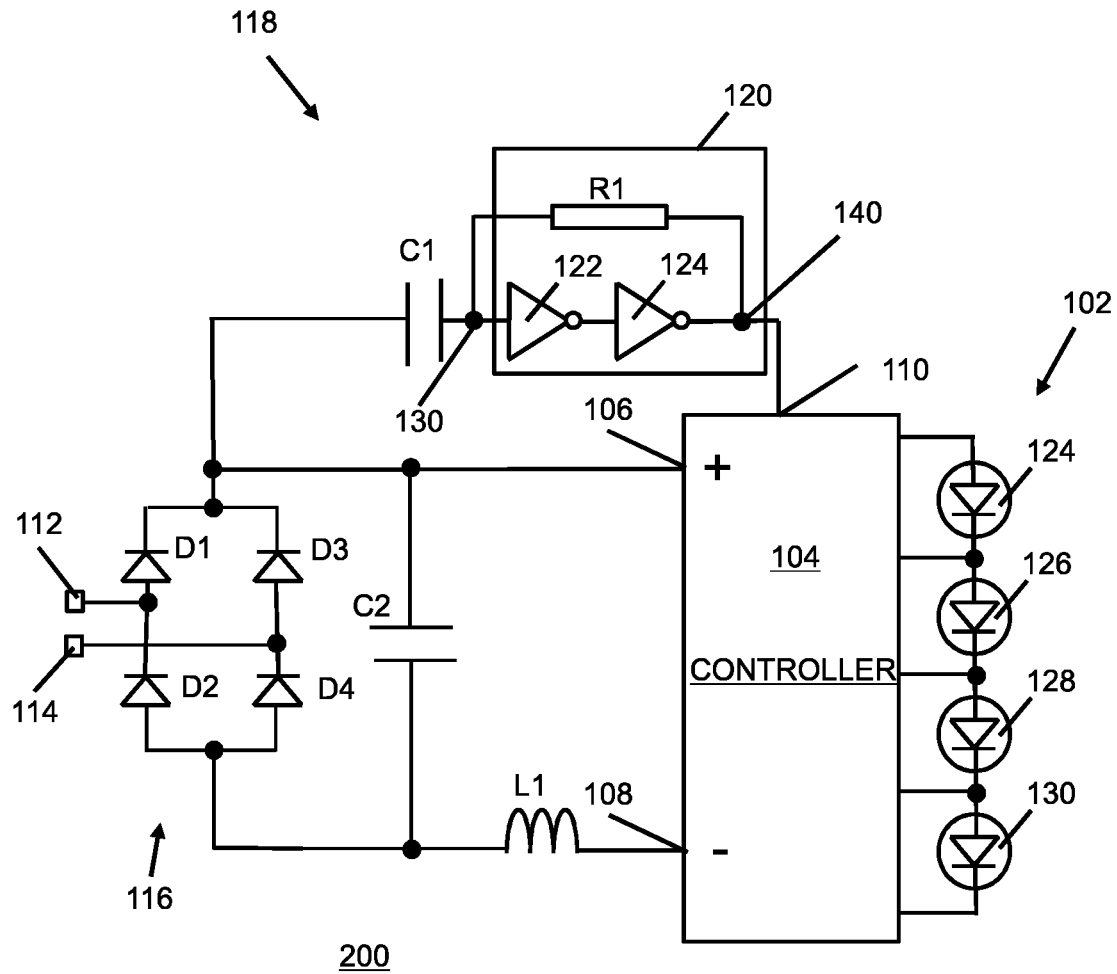
FIG. 2 is a schematic circuit diagram of another circuit for controlling electrical power to a load, according to another embodiment of the present invention.

Referring to FIG. 2 there is illustrated a schematic circuit diagram of another circuit 200 for controlling electrical power to a load 102, according to another embodiment of the present invention. The circuit 200 is almost identical to the circuit of FIG. 1 with the exception of the location of the inductor L1 and smoothing capacitor C2. Thus, to avoid repetition only the different locations of the inductor L1 and smoothing capacitor C2 will be described.

In the circuit 200, the low pass filter in the form the inductor L1 couples the supply input terminals 112, 144 to the second one of the controller power supply input nodes 108 through respective diodes D2, D4. Also, the supply input terminals 112, 114 are coupled to the first one of the controller supply input nodes 106 through respective diodes D1, D3. Also, as shown, one electrode of the smoothing capacitor C2 is directly coupled to the first one of the controller supply input nodes 106 and a second electrode of the smoothing capacitor C2 is coupled through the inductor L1 to the second one of the controller power supply input nodes 108.

Figure 3:
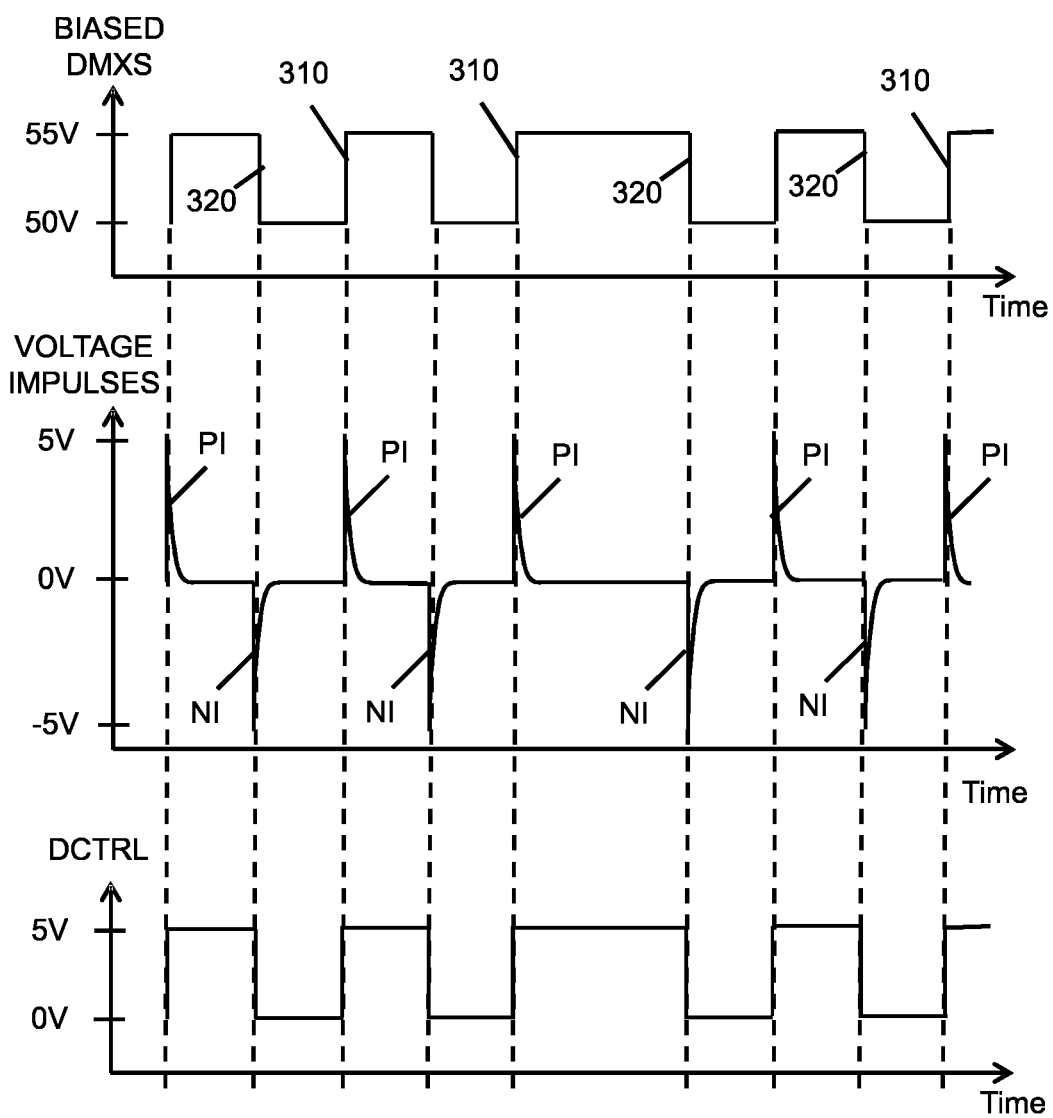
FIG. 3 is a graph illustrating waveforms at specific nodes in the circuit of FIG. 1.

FIG. 3 there is shown a graph 300 illustrating waveforms at specific nodes in the circuit 100. This graph 300 also illustrates the waveforms at specific nodes in the circuit 200 as will be apparent to a person skilled in the art. As shown, a digital control signal such as a biased Digital Multiplex control Signal DMXS is received across the electrical power supply input terminals 112, 114. The biased Digital Multiplex control Signal DMXS is biased since a Direct Current potential (or a very slow alternating current), typically 50 Volts, is also supplied to the terminals 112, 114 for powering the controller 104 and load 102. Due to the charging and discharging effects of the capacitor C1 in response to the corresponding rising 310 and falling 320 edges of the biased Digital Multiplex control Signal DMXS, the positive PI (+5V) and negative NI (−5V) voltage impulses at an input of the polarity triggered latch 120.

In operation, when a positive PI (+5V) voltage impulse is supplied to the input 130 of the polarity triggered latch 120, the output 140 of the polarity triggered latch 120 rises to logic 1 (+5V). After the completion of the positive PI (+5V) voltage impulse duration, the output 140 is maintained at logic 1 due to the feedback resistor R1 acting as a pull up resistor. This pull up resistor action maintains the voltage at the input 130 above the trigger level of the inverter 120 and only when a negative NI (−5V) voltage impulse is supplied to the input 130 will the pull up effects of the feedback resistor R1 be overcome to trigger the inverters 122, 124 resulting in the output 140 falling to logic 0 (0V).

After the completion of the positive NI (−5V) voltage impulse duration, the output 140 is maintained at logic 0 due to the feedback resistor R1 acting as a pull down resistor. This down up resistor action maintains the voltage at the input 130 below the trigger level of the inverter 120 and only when a positive PI (+5V) voltage impulse is supplied to the input 130 will the pull down effects of the feedback resistor R1 be overcome to trigger the inverters 122, 124 resulting in the output 140 rising to logic 1 (+5V). A will be apparent to a person skilled in the art, the voltage at the output 140 is the digital control signal DCTRL that is supplied to the controller data input node 110 and processed by the controller 104.

Figure 4:
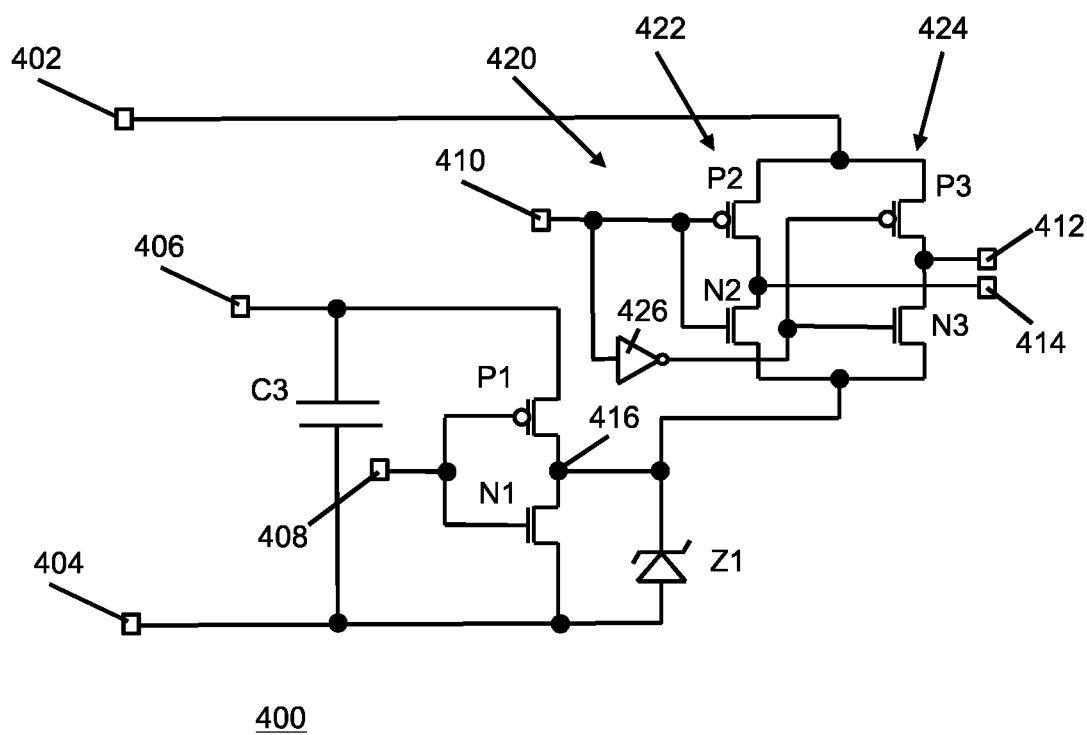
FIG. 4 is a schematic circuit diagram of a signaling and driver circuit, according to an embodiment of the present invention.

Referring to FIG. 4 there is illustrated a schematic circuit diagram of a signaling and driver circuit 400 according to an embodiment of the present invention. The signaling and driver circuit 400 includes a positive power supply input terminal 402, a negative power supply input terminal 404, a signal supply rail input terminal 406, an input signal terminal 408, a polarity control terminal 410 and two output supply terminals 412, 414.

The signaling and driver circuit 400 includes series coupled P-channel P1 and N-channel N1 transistors (typically a complementary transistor pair) coupled across the signal supply rail input terminal 406 and the negative power supply input terminal 404. More specifically, a source electrode of the P-channel P1 transistor is coupled to the signal supply rail input terminal 406 and a source electrode of the N-channel N1 transistor is coupled to the negative power supply input terminal 404. The drain electrodes of the N-channel N1 transistor and P-channel P1 transistor are coupled together at a common node 416 and the gate electrodes of transistors N1 and P1 are coupled to the input signal terminal 408.

Coupled across the signal supply rail input terminal 406 and the negative power supply input terminal 404 is a smoothing capacitor C3. This smoothing capacitor C3 typically has a value of 10 Micro-Farads and reduces noise that may otherwise be supplied across the transistors N1 and P1. Also, an over voltage protection Zener diode Z1 is coupled across the common node 416 and negative power supply input terminal 404. The Zener diode Z1 is arranged so that its cathode is coupled to the common node 416 and its anode is coupled to the negative power supply input terminal 404.

The signaling and driver circuit 400 also includes an output polarity switching unit 420. The output polarity switching unit 420 has a first pair 422 of series coupled P-channel P2 and N-channel N2 transistors coupled across the positive power supply input terminal 402 and the common node 416. This first pair 422 is arranged so that a source electrode of the P-channel P2 transistor is coupled to the positive power supply input terminal 402 and a source electrode of the N-channel N2 transistor is coupled to the common node 416. The drain electrodes of the N-channel N2 transistor and P-channel P2 transistor are coupled together at the output supply terminal 414.

The output polarity switching unit 420 also has a second pair 424 of series coupled P-channel P3 and N-channel N3 transistors coupled across the positive power supply input terminal 402 and the common node 416. This second pair 424 is arranged so that a source electrode of the P-channel P3 transistor is coupled to the positive power supply input terminal 402 and a source electrode of the N-channel N3 transistor is coupled to the common node 416. The drain electrodes of the N-channel N3 transistor and P-channel P3 transistor are coupled together at the output supply terminal 412.

The gate electrodes of the P-channel P2 transistor and N-channel N2 transistor are coupled to the polarity control terminal 410. Also, the polarity control terminal 410 is coupled through an inverter 426 to gate electrodes of the N-channel N3 transistor and P-channel P3 transistor.

In operation, the signaling and driver circuit 400 may operate as an encoder such as a Digital Multiplex DMX encoder. The encoder operation of the signaling and driver circuit 400 is achieved by supplying a 5 volt Direct Current potential at the signal supply rail input terminal 406 relative to the negative power supply input terminal 404. Also, a control signal (Ctrl) is supplied to the input signal terminal 408. When the control signal Ctrl is high the P-channel P1 transistor is in a non-conducting state and the N-channel N1 transistor is in a conducting state. As a result, the common node 416 and source electrodes of transistors N2 and N3 are approximately at logic zero since they are essentially coupled to the negative power supply input terminal 404. When the control signal Ctrl is low the P-channel P1 transistor is in a conducting state and the N-channel N1 transistor is in a non-conducting state. As a result, the common node 416 and source electrodes of transistors N2 and N3 are at logic one since they are coupled to the positive power supply input terminal 402. This controlling of the transistors P1 and N1 can thus be used to provide Digital Multiplex DMX control Signals at the common node 416.

Also in operation, a 50 volt Direct Current potential (or a very slow alternating current) is provided at positive power supply input terminal 402 relative to the negative power supply input terminal 404. If the control terminal 410 is high relative to the negative power supply input terminal 404, the transistors N2 and P3 are in a conducting state, and transistors N3 and p2 are in a non-conducting state. Consequently, the 50 volt Direct Current potential is supplied to supply terminal 412 and supply terminal 414 is coupled through the Zener diode Z1 to zero potential provided at the negative power supply input terminal 404. The conducting state of transistor N2 also provides a path for the Digital Multiplex control Signals DMXS to be provided at the supply terminal 414.

In contrast, if the polarity control terminal 410 is low relative to the negative power supply input terminal 404, the transistors N2 and P3 are in a non-conducting state and transistors N3 and p2 are in a conducting state. Consequently, the 50 volt Direct Current potential is supplied to supply terminal 414 and supply terminal 412 is coupled through the Zener diode Z1 to zero potential provided at the negative power supply input terminal 404. The conducting state of transistor N3 also provides a path for the Digital Multiplex control Signals DMXS to be provided at the supply terminal 412. Thus, it will be apparent to a person skilled in the art that the signaling and driver circuit 400 provides for both switching the polarity of the output supply terminals 412, 414 and switching which of output supply terminals 412, 414 transmits the Digital Multiplex control Signals DMXS or any other suitable digital control signals. This polarity switching function, provided by the polarity switching unit 420, is useful in preventing corrosion as will be apparent to a person skilled in the art.

Figure 5:
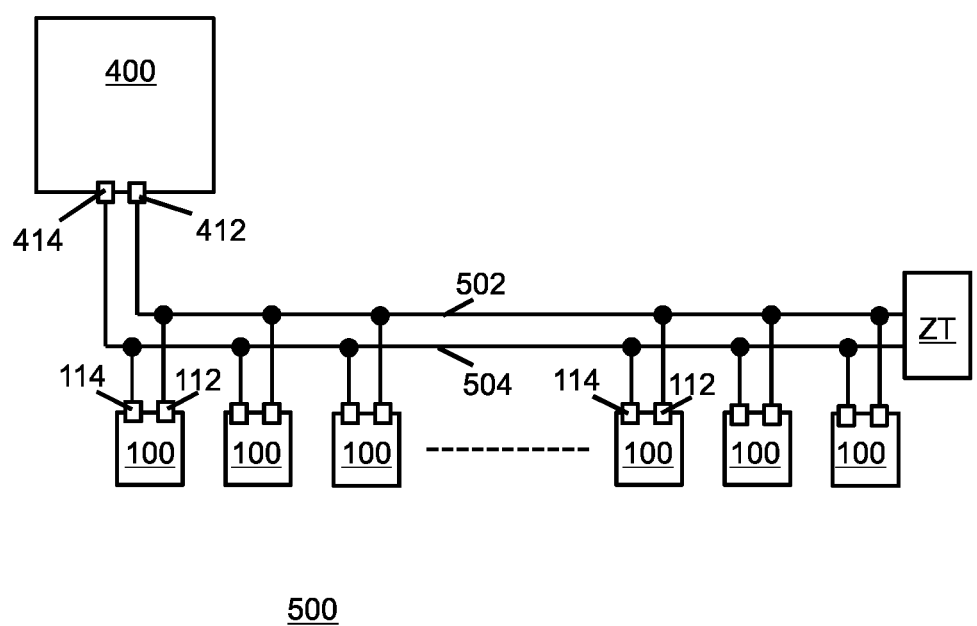
FIG. 5 is a schematic circuit diagram of a system for controlling supply of electrical power to a load, according to an embodiment of the present invention.

Referring to FIG. 5 there is illustrated a schematic circuit diagram of a system 500 for controlling supply of electrical power to a load, according to an embodiment of the present invention. The system 500 includes the signaling and driver circuit 400 with the output supply terminal 412, coupled by a wire or cable 502, to a plurality of the circuits 100 at their respective power supply input terminal 112. The signaling and driver circuit 400 is also coupled at the output supply terminal 414, by a wire or cable 504, to the circuits 100 at their respective power supply input terminal 114. As shown, ends of the cables 502, 504 are connected together by terminating impedance ZT to provide a termination that matches the characteristic impedance of the rest of the system 500.

Figure 6:
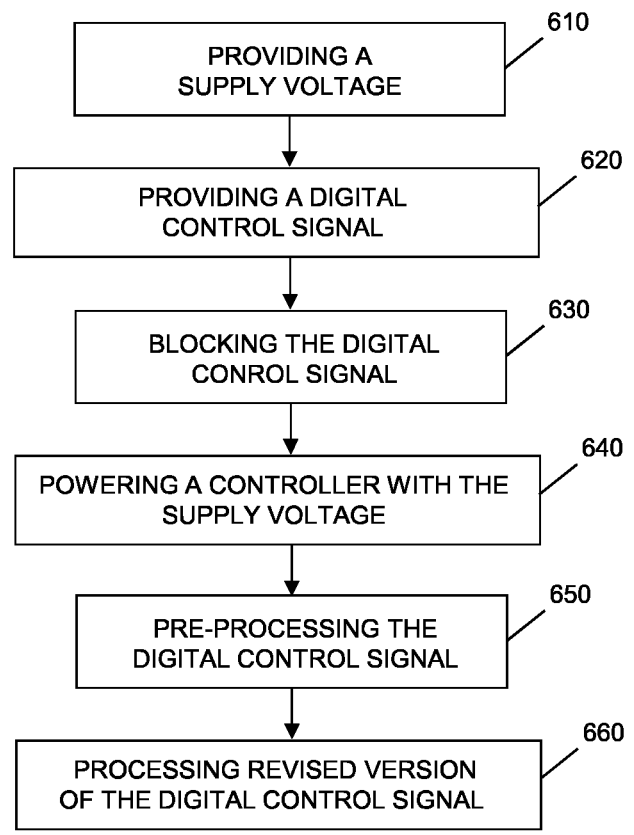
FIG. 6 is a flow chart illustrating a method of controlling electrical power supplied to a load, according to an embodiment of the present invention.

Referring to FIG. 6 there is shown a flow chart illustrating a method 600 of controlling electrical power supplied to a load, according to an embodiment of the present invention. By way of illustration only, the method 600 will be described with reference to the circuit 100 and system 500 described above. At a providing block 610 the method 600 performs providing the 50V supply voltage (typically from the signaling and driver circuit 400) at power supply input terminals 112, 114 of the circuit 100. At a block 620 there is performed a process of providing the digital control signal to the power supply input terminals power supply input terminals 112, 114 again typically from the signaling and driver circuit 400.

At a block 630 the method 600 performs a process of blocking the digital control signal from being received across the power supply input nodes 106, 108. Next at a block 640 there is performed a process of powering the controller 104 with the supply voltage applied to power supply input nodes 106, 108 of the controller 104. The method, at a block 650, performs pre-processing the digital control signal (the biased DMXS) by blocking a voltage bias resulting from power supplied to electrical power supply input terminals 112, 114. Also performed is generating positive and negative voltage impulses in response to the corresponding rising 310 and falling edges 320 of the digital control signal (biased DMXS), and generating the revised version of the digital control signal DCTRL without the voltage biasing.

At a block 660, the method 600 performs processing the revised version of the digital control signal DCTRL by the processer to thereby control the electrical power supplied to a load 102. This processing can include supplying Pulse Width Modulated current to the load in response to the revised version of the digital control signal DCTRL.

Advantageously the present invention alleviates the problem associated with loading of the signal supplied from the signaling and driver circuit 400 to the circuits 100. This is achieved by the signal pre-processing unit 118 and also by the inductor L1. The signal pre-processing unit 118 also removes noise and from the digital control signal (the biased DMXS). The signal pre-processing unit 118 may also address problems associated with slow the rise and fall times of the edges of the digital control signal (the biased DMXS) in that the digital control signal DCTRL edges are not unduly affected by loading of many circuits 100 in the system 500.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

The invention claimed is:

1. A circuit for controlling electrical power to a load, the circuit comprising:
    a controller including power supply input nodes and a controller data input node;
    power supply input terminals for supplying electrical power to the circuit;
    a digital control signal pre-processing unit coupling one of the power supply input terminals to the controller data input node, the digital control signal pre-processing unit including a capacitor arranged to block voltage biasing resulting from power supplied to electrical power supply input terminals from being supplied to the controller data input node, wherein the digital control signal pre-processing unit is arranged to generate positive and negative voltage impulses in response to corresponding rising and falling edges of a digital control signal provided at the power supply input terminals and wherein the digital control signal pre-processing unit is further arranged to generate a revised version of the digital control signal without the voltage biasing, and
    a bridge rectifier coupling the power supply input terminals to the power supply input nodes, wherein the bridge rectifier couples one of the supply input terminals to the digital control signal pre-processing unit.

2. The circuit as claimed in claim 1, further including a low pass filter coupling one of the supply input terminals to a first one of the controller power supply input nodes, wherein a second one of the supply input terminals is coupled to a second one of the controller supply input terminals and wherein the low pass filter is arranged to block the digital control signal from being received across the power supply input nodes.

3. The circuit as claimed in claim 1, wherein the digital control signal pre-processing unit includes a polarity triggered latch.

4. The circuit as claimed in claim 3, wherein the polarity triggered latch includes at least one inverter with a feedback resistor connected across the inverter.

5. The circuit as claimed in claim 3, wherein the polarity triggered latch includes two series connected inverters with a feedback resistor connected across the two inverters.

6. The circuit as claimed in claim 3, wherein the polarity triggered latch includes at least one buffer with a feedback resistor connected across the buffer.

7. The circuit as claimed in claim 3, wherein the polarity triggered latch includes two series connected buffers with a feedback resistor connected across the buffers.

8. The circuit as claimed in claim 1, wherein the controller includes a decoder for decoding revised version of the digital control signal.

9. The circuit as claimed in claim 1, wherein the controller is adapted to supply Pulse Width Modulated (PWM) current to the load.

10. The circuit as claimed in claim 1, further including a load coupled to the controller.

11. The circuit as claimed in claim 10, wherein the load includes at least one Light Emitting Diode.

12. A system including a signaling and driver circuit coupled to more than one circuit as claimed in claim 1.

13. A method of controlling electrical power supplied to a load, the method comprising:
    providing a supply voltage at power supply input terminals of a circuit;
    providing a digital control signal to the power supply input terminals;
    powering a controller with the supply voltage to power supply input nodes of the controller, wherein a bridge rectifier couples the power supply input nodes to the power supply input terminals and wherein the controller is coupled to the load;
    pre-processing the digital control signal at a digital control signal pre-processing unit coupled to one of the supply input terminals via the bridge rectifier, wherein the digital control signal pre-processing unit couples one of the power supply input terminals to a data input node of the controller, by blocking, using a capacitor, a voltage bias resulting from power supplied to electrical power supply input terminals from being supplied to the data input node of the controller, generating positive and negative voltage impulses in response to corresponding rising and falling edges of the digital control signal, and generating a revised version of the digital control signal without the voltage biasing; and processing the revised version of the digital control signal by the processer to thereby control the electrical power supplied to a load.

14. The method as claimed in claim 13, wherein the processing further includes supplying Pulse Width Modulated current to the load.

15. The method as claimed in claim 13, wherein the load includes at least one Light Emitting Diode.

16. The method as claimed in claim 13, comprising blocking the digital control signal from being received across the power supply input nodes.

* * * * *